(No Model.) 4 Sheets—Sheet 1.
G. B. SNOW.
CORN HARVESTER AND HUSKER.
No. 353,384. Patented Nov. 30, 1886.
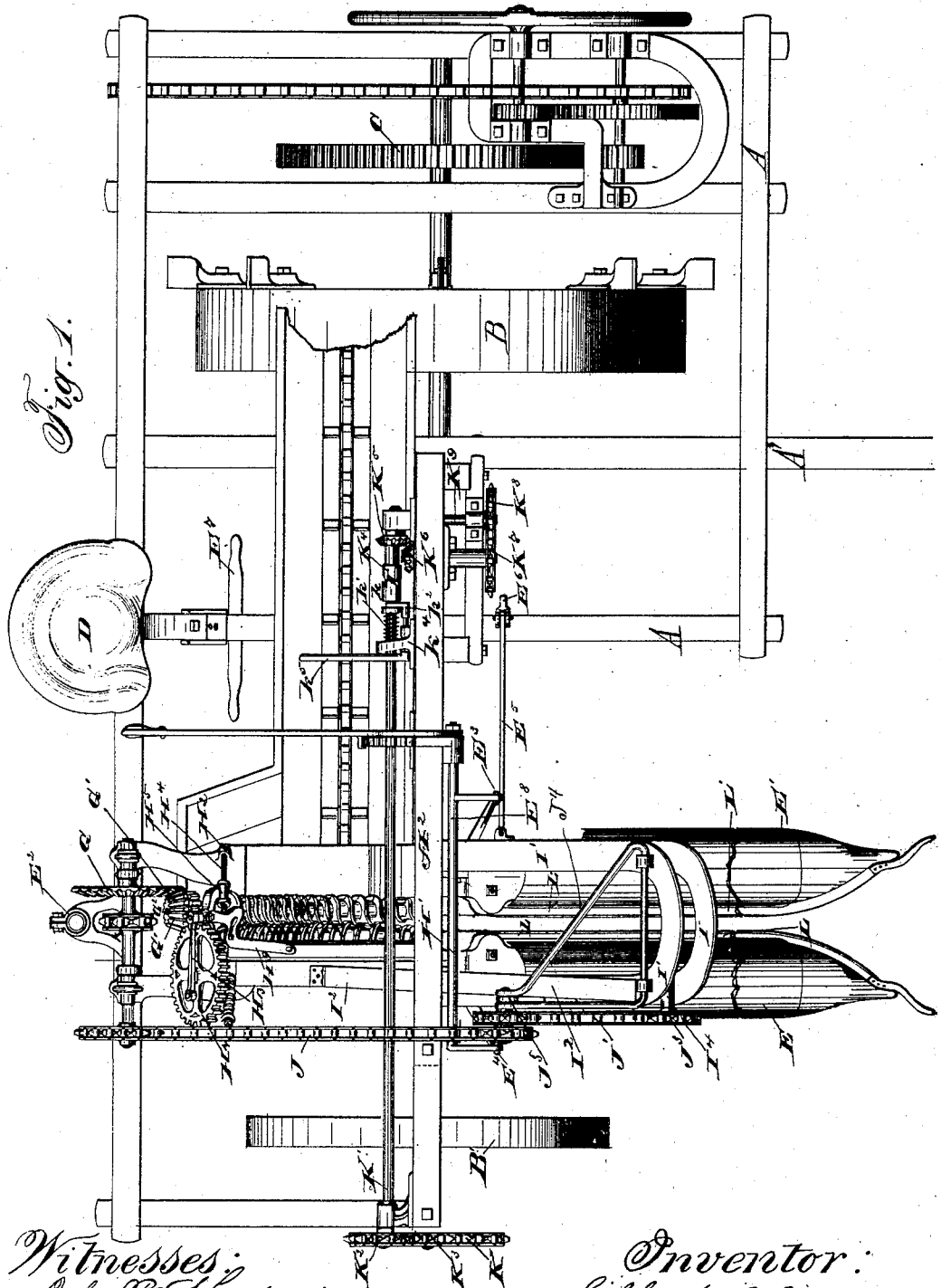

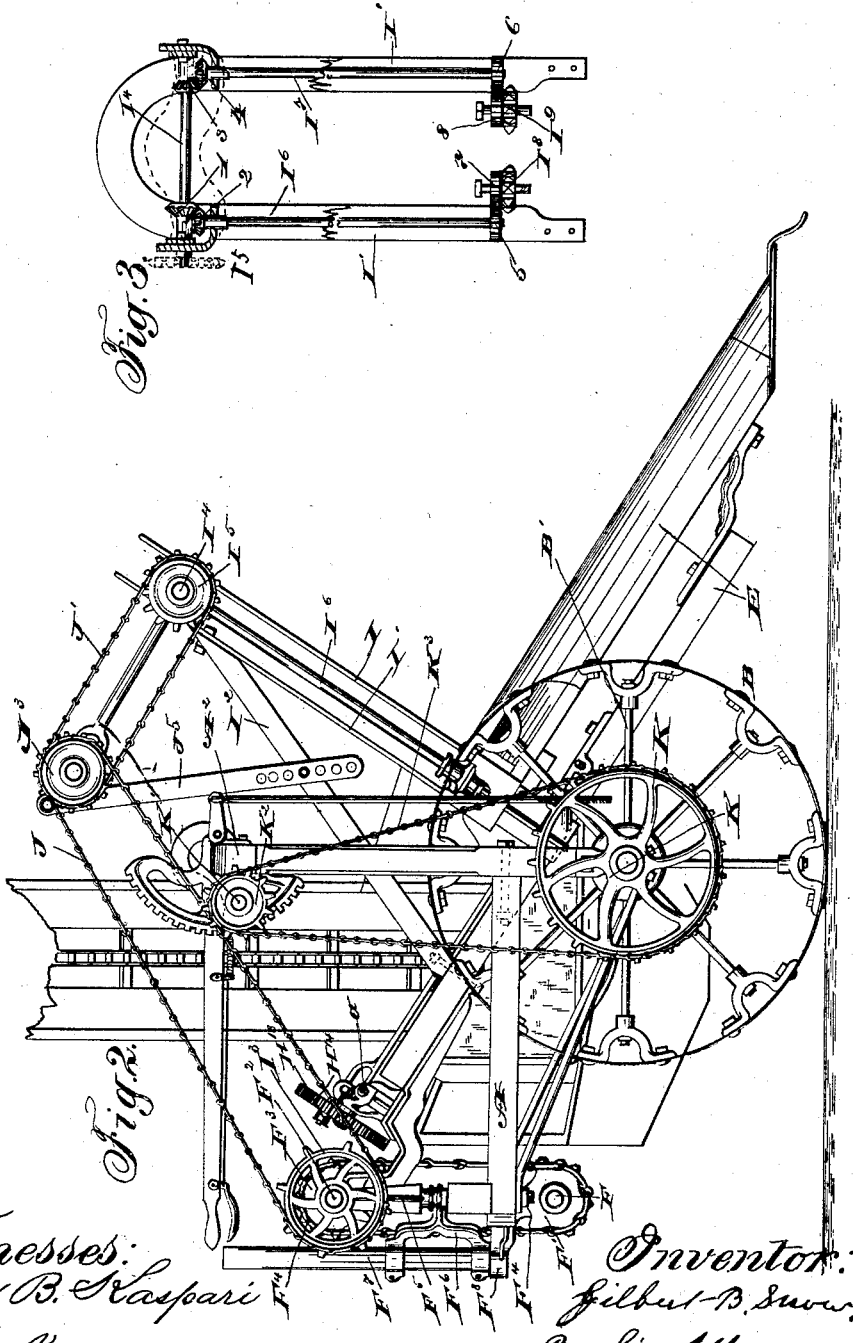

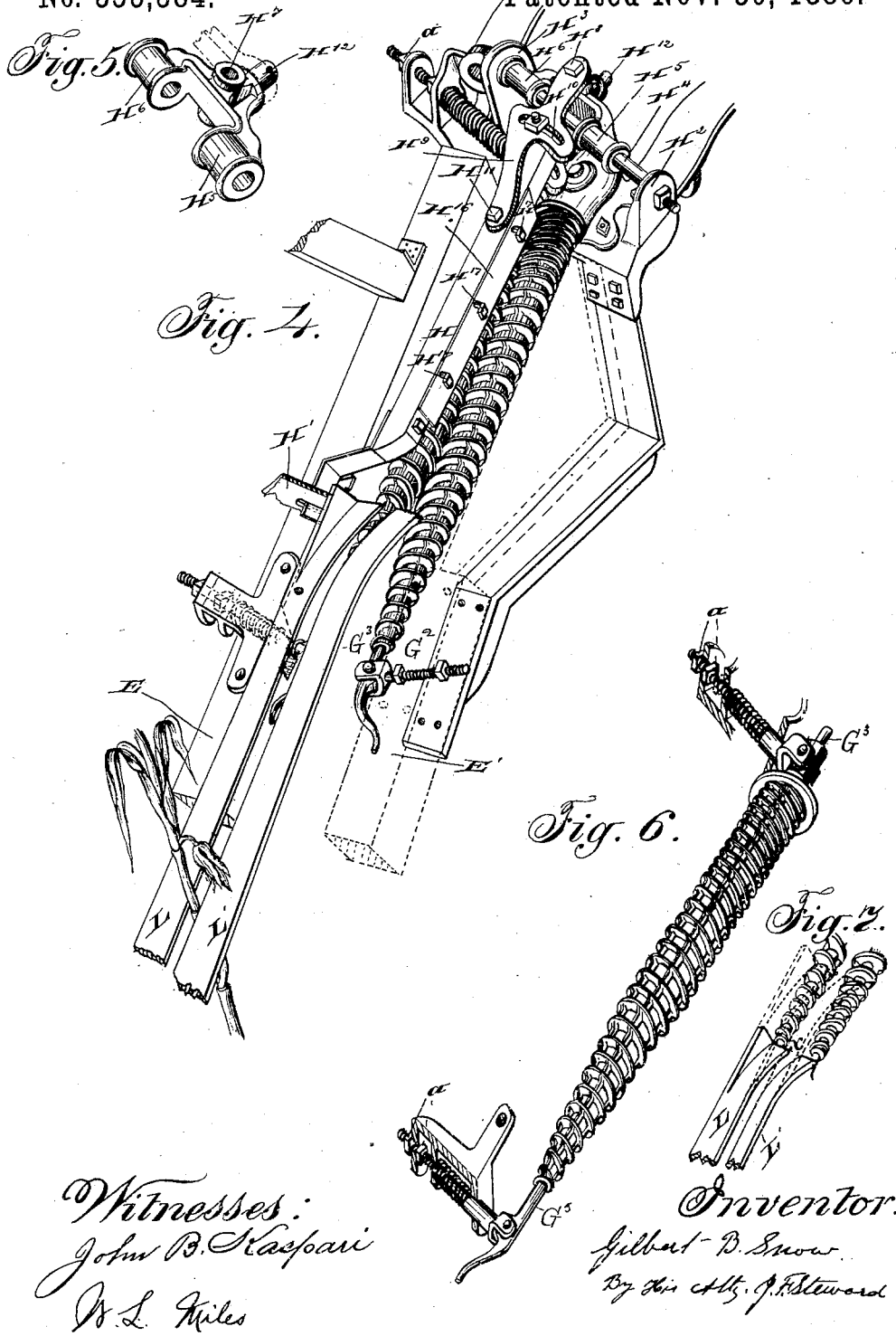

(No Model.) 4 Sheets—Sheet 4.

G. B. SNOW.
CORN HARVESTER AND HUSKER.

No. 353,384. Patented Nov. 30, 1886.

Witnesses:
John B. Kaspari
H. L. Miles

Inventor:
Gilbert B. Snow.
By his Atty J. H. Steward

UNITED STATES PATENT OFFICE.

GILBERT B. SNOW, OF SUGAR GROVE, ASSIGNOR TO WILLIAM DEERING, OF CHICAGO, ILLINOIS.

CORN HARVESTER AND HUSKER.

SPECIFICATION forming part of Letters Patent No. 353,384, dated November 30, 1886.

Application filed October 6, 1884. Serial No. 144,879. (No model.)

*To all whom it may concern:*

Be it known that I, GILBERT B. SNOW, of Sugar Groove, in the county of Kane and State of Illinois, have invented certain new and useful Improvements in Corn Harvesters and Huskers, of which the following is a full description, reference being had to the accompanying drawings, in which—

Figure 8:
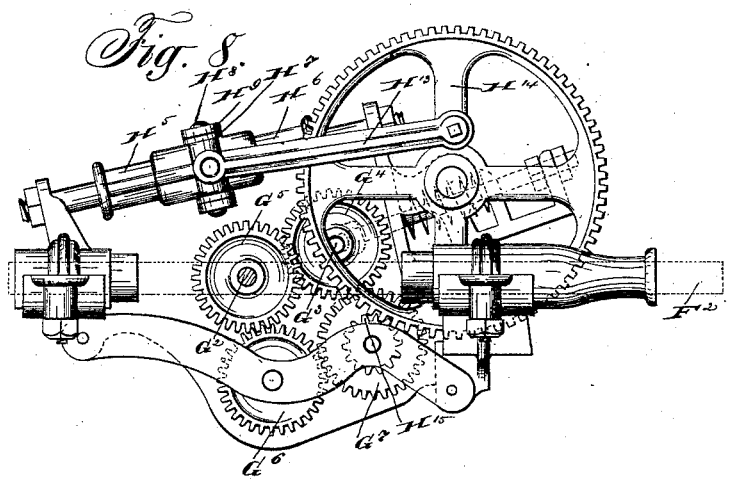
Figure 9:
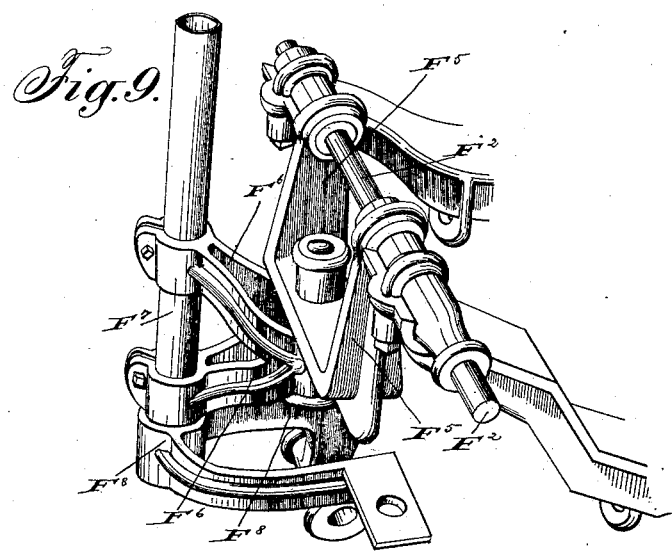

Figure 1 is a plan view of the machine. Fig. 2 is a left-hand side elevation. Fig. 3 is a front elevation of the yoke for giving stiffness to the gathering-frame and to form a support for the gearing that moves the gathering-chains. Fig. 4 is a perspective view of the picking mechanism and its supports, showing particularly the two guide-plates which overlie the rolls. Fig. 5 is a perspective detail view of the slide which gives motion to the stem-breaking bar. Fig. 6 is a perspective view of the mechanism for giving elastic support to the picking-rollers. Fig. 7 is introduced to illustrate the effect of lengthening out the ear-guiding plates. Fig. 8 is a rear end view of the gears connecting the picking-rollers and for moving the stem-breaking bar. Fig. 9 is a perspective view of the pivotal support for the gathering-frame.

This improvement relates to the class of machines shown and described in Letters Patent No. 311,526 to Randall and Snow.

As this invention is confined to details of construction, only a general description of the machine, as a whole, need be given.

A is the main frame; A', the draft-tongue. B is the main supporting and traction wheel. B' is the lesser supporting and traction wheel. C is the gearing for giving motion to the various parts. D is the attendant's seat.

E and E' are the side bars of the gathering-frame, so far separated from each other that a stalk of corn may be carried by the gathering-chains upward between them. The gathering-frame is pivoted at $E^2$ to the main frame so as to be capable of lateral vibrations at its front end. The gathering-frame is suspended from the bar $A^2$ of the main frame by the rods $E^3$ and $E^4$, which depend from the arms of the shaft $E^8$, and take it at a point not far from its center of gravity. By means of the rod $E^5$ the gathering-frame is connected to the arm $E^6$ of a rock-shaft provided with the foot-lever $E^7$, so located that the feet of the attendant may rest upon its ends. By pressure upon the ends of this lever the forward end of the gathering-frame may be swung to conform to the sinuosities of the row of corn being gathered. The mechanism for adjusting the height of the forward end of the gathering-frame does not differ from that shown and described in the patent before referred to.

F is a shaft extending across the rear of the machine, driven by the gearing already mentioned, and having the sprocket-wheel F'. Immediately above the sprocket-wheel is that $F^3$ on the shaft $F^2$. Connecting these wheels is the chain $F^4$. The shaft $F^2$ is supported in bearings in the bracket $F^5$, which in turn is supported on the bracket $F^6$, and adapted to vibrate horizontally. The bracket $F^6$ is adapted to be adjusted vertically on the support $F^7$. This last support is a gas-pipe, (so made for lightness,) and projects upward from the bracket $F^8$, which is bolted to the main framework of the machine. By this vertical adjustment the chain $F^4$ is kept taut. In the tops of the upreaching arms of the bracket $F^5$ the shaft $F^2$ has bearings, and on the shaft is mounted the bevel-gear G, which meshes into the bevel-pinion G', keyed to the shaft $G^2$ of one of the picking-rollers.

As far as given, the description is but a repetition of that above referred to. Attention will now be given to the details which form the subject-matter of the present invention. As my device for permitting the picking-rollers to act upon the stems of the corn yieldingly will be first described, attention is called to Figs. 4 and 6, where the parts are better shown.

$G^2$ and $G^3$ are the shafts of the picking-rollers. One upon each is mounted the gears $G^4$ and $G^5$. These do not mesh together, as in the earlier machine, but are from preference of larger diameter in relation to the rollers which they drive, and, being so large that they cannot be brought to intermesh without crowding the rollers too far apart, they are so placed that their peripheries pass one by the side of the other.

I mount the bearing of the roller-shaft $G^3$ in the crotched end of a rod, around which I coil a wire spring. This rod I support in a bracket on the gathering-frame, and provide means for regulating the tension of the spring, consisting of the nuts $a$ threaded on the rods. Each rod is provided with two nuts, as shown, which may be set against the opposite sides of the supporting-bracket at will in order to hold the rod rigidly in place and thus prevent the yielding action of the roll when demanded. The roller-shaft $G^2$ receives its motion from the gearing, as already described, and from this I transmit power to the roller $G^3$ by the wheels $G^6$ and $G^7$, the four wheels intermeshing, as shown. As the gear-wheels $G^4$ and $G^5$ are in different vertical planes and overlap at the edges, I make either the wheel $G^6$ or $G^7$ with a face sufficiently wide to engage the two connecting-wheels in different planes. The wheels $G^6$ and $G^7$ revolve loosely on pins on a cross-bar of the gathering-frame. The yielding of the spring permits the shaft $G^3$ to recede from the shaft having the opposing roller, and in this movement the gear $G^4$ shifts its position in relation to that which drives it—the gear $G^7$—but as the movement is in the direction to not materially disturb the proper rolling of the two gears together, I provide no mechanism to keep the exact distance between their centers constant.

The next feature of my invention relates to the device for breaking the ears from the stems, consisting of the bar H, its foremost end adapted to enter and slide in a slot in the lug $H'$ and vibrate over the picking-rollers, and bend the stems of the ears sharply while they are drawn tightly between the said rollers.

Upon the bracket which forms a support and bearings for the picking-rollers are the upwardly-turned lugs $H^2$ and $H^3$, forming a support at their summits for the rod $H^4$, upon which slide the sleeves shown in Fig. 5. This bracket has the sleeve-bearings $H^5$ and $H^6$, and is thus adapted to slide upon the rod $H^4$. $H^7$ is an eye provided in the casting for receiving the bolt $H^8$, by which the arm $H^9$, forming a part of the breaker H, is pivotally secured thereto. The bracket is also provided with the wrist $H^{12}$, connected to which and to a wrist on the wheel $H^{14}$ is the pitman $H^{13}$. The gear $H^{14}$ is suitably mounted on the gathering-frame, and receives its motion from the pinion $H^{15}$, cast as one piece with the gear $G^7$.

As it is desirable that the breaker should be adjustable, so as to vary the height above the rollers as well as to vary the effective stroke when moving to break the ears from the stems, I provide the bar with the plate $H^{16}$, having vertical slots and bolted therethrough to the said bar. By loosening the bolts $H^{17}$ the plate may be raised or lowered, as required, and there resecured at will.

The arm $H^9$ is provided with the slot $H^{10}$, and is so pivoted at $H^{11}$ to the bar that it may be swung in either direction in relation to the latter, limited only by the length of the slot, and the said bar thus thrown forward so as to move a greater distance after reaching the ears, whose stems may be drawn between the rollers.

Heretofore I have terminated the gathering-chains very nearly at the forward ends of the picking-rollers. I now raise them sufficiently high above the rollers that I may extend them well along after reaching their forward ends. Parallel with the gathering chains, and serving as guides for the ears of corn, are the plates L and L', one upon each side of the stalks as they are fed along. These plates are but as far apart as the diameter of a large cornstalk, and they are continued upward to a point where the rollers, enlarging rearwardly as they do, form so narrow a space that even small ears are not likely to be taken through. It is plain that, should the ear-guides terminate at the beginning of the rollers, a space would be left so large that ears of no small size might drop through. Fig. 7 is introduced to illustrate the point under consideration more clearly. If the plates terminate as shown by full lines in the figure, the open space $x$ is left; but if they are continued onward as shown in dotted lines, the space no longer appears.

The forward-reaching arms E and E' of the gathering-frame being from necessity very long, need some support to keep them from springing apart. I provide the two strong U-shaped yokes I and I', and secure their ends to the sides of the gathering-frame, one to each. These arches by their stiffness serve to keep the members of the frame from spreading, and I make them serve the further purpose of a support for the gearing that gives motion to the gathering-chains. The yokes are prevented from falling forward or being drawn backward by the brace $I^2$, which serves to tie its top to the gathering-frame. At the summit of the yoke I place the horizontal shaft $I^4$, mounted in suitable bearings, and having the sprocket-wheel $I^5$ and the miter-gears 1 and 3, meshing into which are the gears 2 and 4 on the upper ends of the shafts $I^6$ and $I^7$. These last shafts are suitably supported in bearings on the side bars of the yokes, and have at their lower ends the gears 5 and 6. These in turn mesh into the gears 7 and 8, secured to which are the sprocket-wheels $I^8$ and $I^9$, which carry the gathering-chains already described. The sprocket-wheel $I^5$ is thus the prime mover of both gathering-chains. The sprocket-wheels $I^3$ and $I^5$ are connected by the chains J and J'. In order to carry these chains so high as to be above the frame-work, I provide the intermediate double wheel, $J^3$, and around it throw the two chains. In order that slack may be taken up as it accumulates, I mount the double wheel on an arm pivotally secured to the top of the yoke, which arm consists of the triangular frame $J^4$, having the stud upon the outer extremity, upon which the sprocket-wheel $J^3$ turns.

$J^5$ is a brace connecting the outreaching end of the arm $J^4$ to the brace $I^2$, and having a series of holes by which it may be adjusted.

I utilize the traction of the supporting-wheel B' as motive power for driving the elevating mechanism by providing its axle with the sprocket-wheel K. Upon the shaft K', supported in bearings on the rail A² of the main frame, I place the sprocket wheel K², and around it and K, I throw the chain K³. Loose upon this shaft, and having a sleeve-like hub which terminates in a clutch, K⁴, is the miter-gear K⁵. This meshes into the gear K⁶ on a short shaft which carries the sprocket-wheel K⁷. K⁸ is a sprocket-wheel keyed to the shaft K⁹, which directly drives the elevator. This shaft is the equivalent of that P³ in the previous application.

In order that the gear K⁵ may be locked to the shaft when required, I provide the clutch $k$, adapted to slide on the shaft, but forced to turn therewith.

$k'$ is a spring, adapted to move the clutch $k$ into engagement with its mate, that K⁴. $k$ has a circumferential groove, and receives the crotch $k^2$, which is adapted to be slid endwise by the lever $k^3$.

$k^4$ is a bearing for the stem of the crotch $k^2$, and has a wing made cam-shaped, which serves to force the lever $k^5$ endwise as it is moved up and down, and thus draw the clutch out of engagement, and also to permit it to enter. The clutching mechanism is thus made controllable by the attendant, the lever being within his easy reach while in his seat.

The importance of this improvement will be seen when it is understood that in turning at the end of the row of corn to begin another it is not possible for the driver of the wagon into which the corn is delivered to keep in position to receive the corn being elevated. At the end of the row the attendant throws the elevator out of gear and the delivery ceases. Should he start into the next row before the receiving-wagon is ready, the ears accumulate in the hopper of the elevator until upon his approach the clutches are made to engage and the elevator goes on with its work.

What I claim is—

1. In combination with the co-operating rolls adapted to admit the standing corn between them, the longitudinal breaker-bar H, overlying one of said rolls, mechanism operating to move the rear end of the bar laterally and longitudinally, and the guide engaging the forward end of the bar and directing the same longitudinally, whereby the breaker-bar is caused to pass obliquely across the path of the stalks.

2. The picking mechanism, in combination with breaking mechanism, means whereby it may be adjusted so that the length of its stroke while in contact with the ear may be varied, substantially as and for the purpose specified.

3. In a corn-harvester, picking-rollers supported in bearings adapted to be made rigid in relation to each other or to yield elastically, substantially as and for the purpose described.

4. The two spirally-ribbed rolls reduced in diameter toward their forward ends, in combination with the two overlying guide-plates L and L', beginning at a point in advance of the rolls and extending thereover to a point at or near the termination of their reduced portions, said plates formed with broad upper surfaces, substantially as described, adapted to sustain the detached ears and prevent their descent between the rolls.

GILBERT B. SNOW.

Witnesses:
JOHN B. KASPARI,
JOHN F. STEWARD.